United States Patent [19]

Yamane

[11] Patent Number: 5,462,292
[45] Date of Patent: Oct. 31, 1995

[54] DOOR SEAL DEVICE

[75] Inventor: Tadanao Yamane, Hiroshima, Japan

[73] Assignee: Nishikawa Rubber Co., Ltd., Hiroshima, Japan

[21] Appl. No.: 160,069

[22] Filed: Nov. 30, 1993

[30] Foreign Application Priority Data

Nov. 30, 1992 [JP] Japan ............................... 4-345267
Nov. 30, 1992 [JP] Japan ............................... 4-345268

[51] Int. Cl.⁶ .................................................. G06B 7/16
[52] U.S. Cl. ........................ 277/181; 49/484.1; 49/490.1
[58] Field of Search ............................ 277/181, 189, 277/226, 34; 49/490.1, 489.1, 484.1, 475.1

[56] References Cited

U.S. PATENT DOCUMENTS

| | | | |
|---|---|---|---|
| 4,625,459 | 12/1986 | Warner | 49/490.1 |
| 4,901,476 | 2/1990 | Nagashima et al. | 49/484.1 |
| 5,010,689 | 4/1991 | Vaughan | 49/489.1 |
| 5,347,758 | 9/1994 | Yamane | 49/484.1 |

*Primary Examiner*—Daniel G. DePumpo
*Attorney, Agent, or Firm*—Flynn, Thiel, Boutell & Tanis

[57] ABSTRACT

A door seal device comprising a hollow main seal and a sub-seal which elastically contact the door opening end edge of a vehicle body for sealing a space between the body and a door, wherein both the main seal and the sub-seal are arranged side by side along and respectively attached to a door sash at the interior and exterior sides thereof, and wherein at least one slip prevention rib projects from at least either the main seal and/or the sub-seal at the portion thereof where the main seal and the sub-seal overlap one another.

7 Claims, 5 Drawing Sheets

5,462,292

DOOR SEAL DEVICE

BACKGROUND OF THE INVENTION

1. Field of the Invention

The present invention relates to a door seal device comprising a main seal and a sub-seal which are arranged side by side along and attached to a door sash at interior and exterior sides wherein the main seal and the sub-seal elastically contact a body opening end edge for sealing the space between the body and the door of a car.

2. Prior Art

As illustrated in FIGS. 1 and 2, a prior art door seal device 30 elastically contacts the body opening end edge 10 of a car for sealing the space between a body 10' and a door 20 and comprises a hollow main seal 40 and a lip-shaped sub-seal 50 which are respectively arranged side by side along and attached to a door sash 21 at an interior side 11 and an exterior side 12 of the door. When the door seal device 30 is attached to the sash 21, the body of the sub-seal 50 covers the upper surface of the sash 21 at the exterior side 12 and a hook-shaped portion 51 is engaged in a hooked portion 23 of the sash 21 at the exterior side 12 while a hook-shaped portion 52 at the interior 11 is engaged in a retainer 22 in the sash 21. At the same time, the main seal 40 is arranged along the sub-seal 50 at the inner part thereof and is engaged in the retainer 22 formed on the upper surface of the sash 21 at the indoor side.

However, the prior art door seal device has the problem that the main seal 40 and the sub-seal 50 slip out of place relative to each other in the direction of the arrows D and F in the longitudinal direction.

The aforementioned prior art door seal device is illustrated and described in detail in U.S. Pat. No. 5 347 758, owned by the Assignee hereof.

SUMMARY OF THE INVENTION

It is an object of the invention to provide a door seal device capable of preventing a main seal and a sub-seal respectively constituting a door seal device from slipping out of place relative to each other in the longitudinal direction when a door is opened or closed.

To achieve the above object, the door seal device 30 comprises a channel shaped main seal 40 and a hollow sub-seal 50 for sealing a space between a body 10 and a door 20 wherein both the main seal 40 and the sub-seal 50 are arranged side by side along and attached to a sash 21 in a manner that the main seal 40 is attached to the sash 21 at the interior side 11 and the sub-seal 50 is attached to the sash 21 at the exterior side. More in detail, the body of the sub-seal 50 covers the upper side of the sash 21 at the exterior side 12 while a part of the main seal 40 is arranged along the sub-seal 50 and engaged in a retainer 22 formed on the upper surface of the sash 21, characterized in that slip prevention ribs 45 and 55 project from at least either the main seal 40 or and the sub-seal 50 at the intermediate portions where the main seal 40 and the sub-seal 50 overlap each other.

DESCRIPTION OF THE PREFERRED EMBODIMENT

Figure 1:
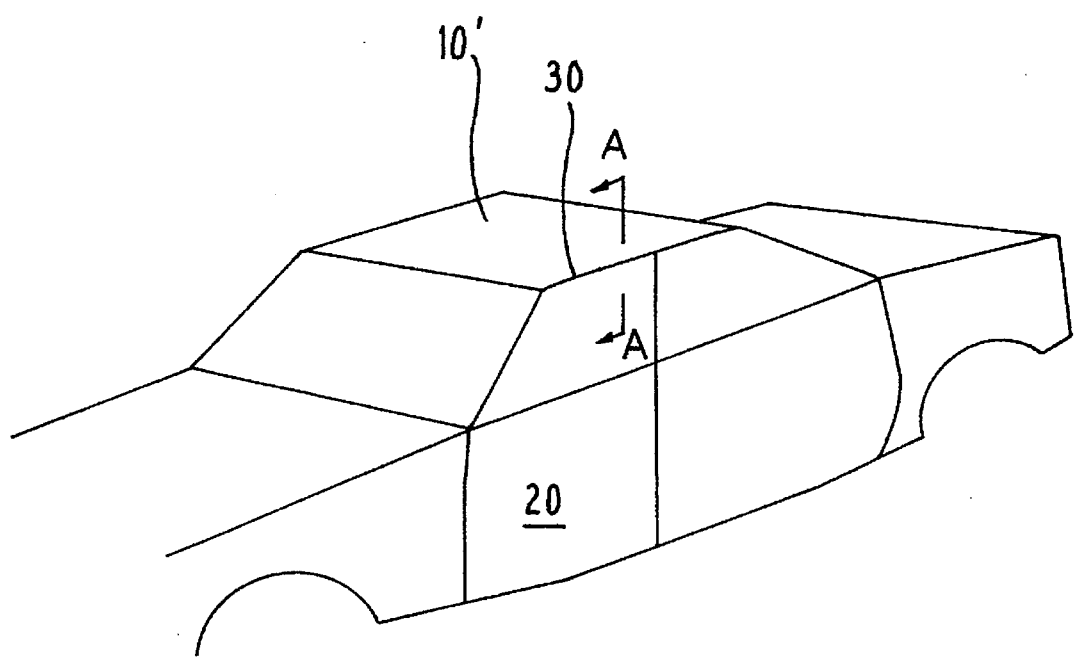
FIG. 1 is a perspective view of a car.
Figure 2:
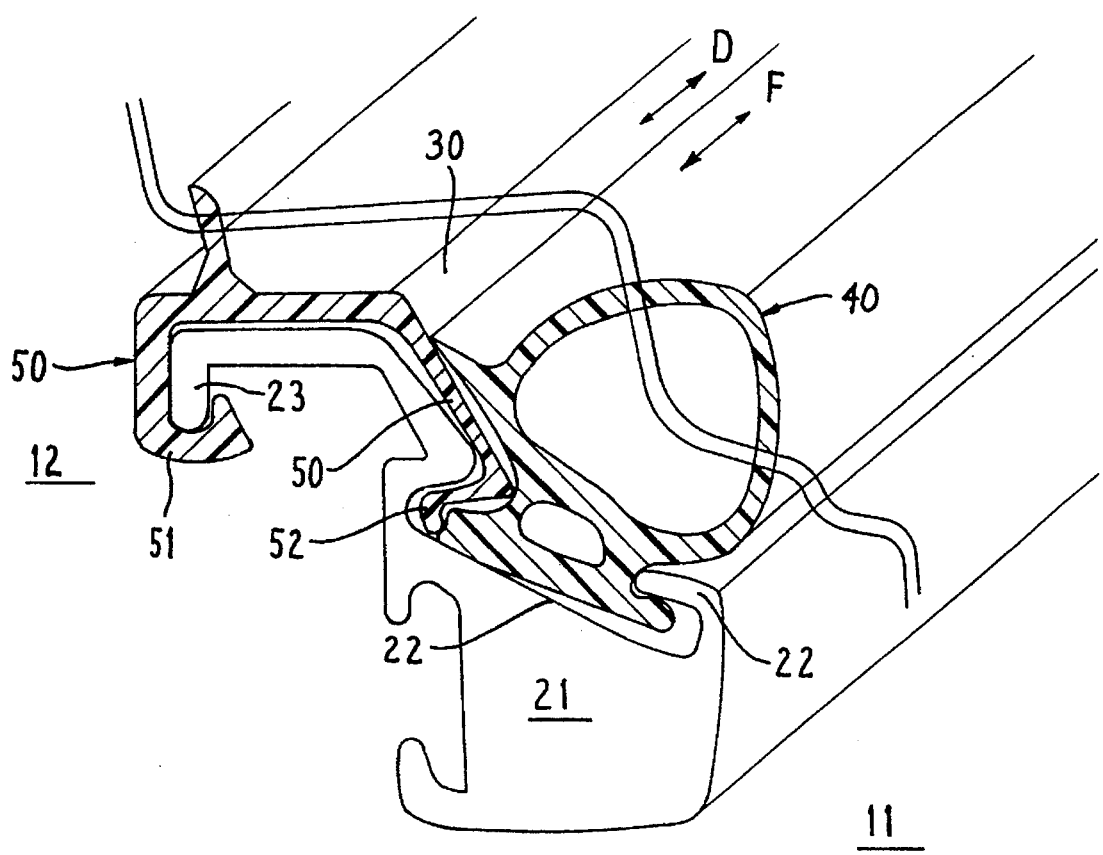
FIG. 2 is a cross-sectional view of a prior art door seal device taken along the line A—A of FIG. 1.

A preferred embodiment of the present invention will be described with reference to FIGS. 1 and 3.

Denoted at 10' is a car body and 20 is a door. A door seal device 30 elastically contacts a body opening end edge 10 for sealing the space between the body edge 10 and the door 20 and comprises a hollow main seal 40 and a channel-like sub-seal 50 wherein both the main seal 40 and the sub-seal 50 are arranged side by side along and attached to a sash 21 in a manner that the seal 40 is attached to the door sash 21 at the interior side 11 and the sub-seal 50 is attached to the sash 21 at the exterior side 12. The sash 21 comprises a body, a retainer 22 formed on the upper side thereof at the interior side 11 and a hook portion 23 at the exterior side 12. The sub-seal 50 comprises a body, a hook portion 51 at the exterior side 12 and a hook-shaped portion 52 at the interior side 11. More in detail, for attaching the door seal 30 to the sash 21, the body of the sub-seal 50 covers the upper surface of the sash 21 at the exterior side 12 while the hook portion 51 is engaged in the hook portion 23 of the sash 21 and the hook-shaped portion 52 is engaged in the retainer 22 which is at the interior side of the sash. The main seal 40 is arranged along the sub-seal 50 at a part thereof and engaged in the retainer 22. Slip-prevention ribs 45 and 55 project from the main seal 40 and the sub-seal 50 at the intermediate portion where the former overlaps and firmly contacts against the latter or vice versa.

More specifically, the sub-seal 50 includes a base wall 61 which at one end is joined to a transversely projecting side leg 62, which base wall 61 at its other end joins to a further side leg 63 which projects in slanted relationship relative to both the base wall 61 and the other side leg 62. The hook portion 51 is provided at the free end of the side leg 62 and projects inwardly toward the other side leg 63. Similarly, the hook portion 52 is provided at the free end of the side leg 63 and projects inwardly toward the other side leg 62.

The main seal 40 includes a generally concave sidewall 66 which is positioned directly adjacent and in opposed relationship to the side leg 63 of the sub-seal 50. This sidewall 66 defines a lip or flange part 67 at one end thereof which is maintained in contact with the side leg 63 in the vicinity of the base wall 61. This sidewall 66 has an enlarged part 68 adjacent the other end thereof, which part 68 projects outwardly beyond the free end of the side leg 63 and engages the hook portion 52. This sidewall 66 and the configuration thereof as defined by the lip part 67 and the enlarged part 68, result in the sidewall defining a generally concave recess 69 which accommodates therein the generally L-shaped configuration defined by the side leg 63 and the hook portion 52 associated therewith.

Figure 3:
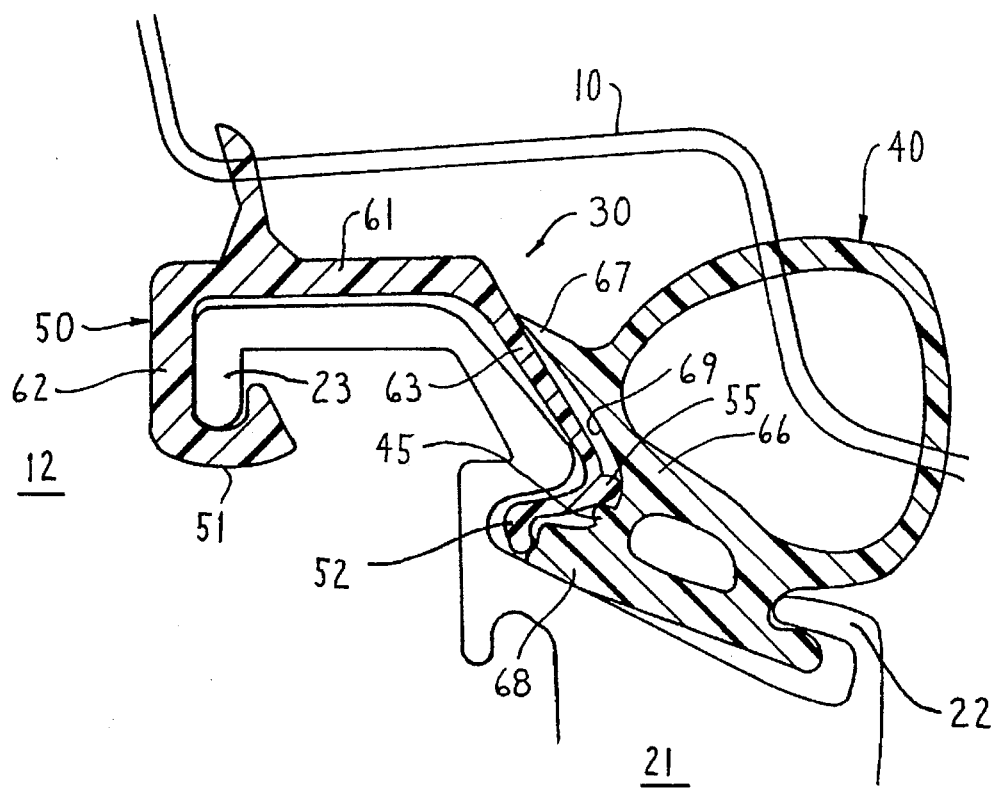
FIG. 3 is a cross-sectional view of a door seal device taken along the line A—A of FIG. 1 according to a preferred embodiment of the present invention.

As illustrated by the embodiment of FIG. 3 and as briefly described above, the sub-seal 50 has a rib 55 which is formed thereon and project outwardly therefrom toward the concave sidewall 66. This rib 55 is positioned generally at and projects outwardly away from the corner defined where the hook portion 52 joins to the free end of the side leg 63. This rib 55 at the free end thereof is maintained in firm contact with the surface of the concave sidewall 66, which contact of the rib against the sidewall occurs at an intermediate location along the sidewall substantially at the bottom of the recess 69.

Also in this embodiment of FIG. 3, the sidewall 66 has a rib 45 which projects outwardly from the surface thereof in a direction toward the sub-seal 50 so as to maintain firm contact therewith. This rib 45 is positioned intermediate the length of the wall 66 so as to be disposed in the vicinity of the base of the recess 69 and, in the illustrated embodiment, is positioned closely adjacent the rib 55 provided on the sub-seal 50. These two ribs 45 and 55, and their respective firm contact with the sub-seal 50 and main seal 40, are effective for preventing relative slip between the seal 40 and sub-seal 50 during opening and closing of the door.

Modifications of the present invention will be described with reference to FIGS. 4 and 5.

Figure 4:
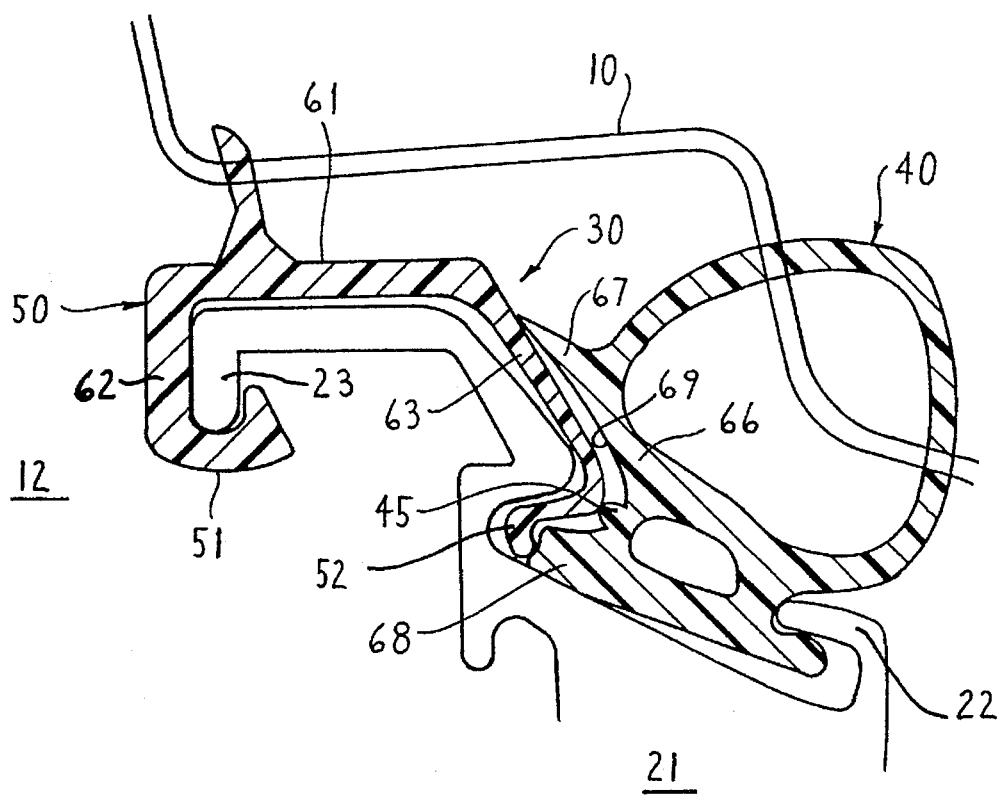
FIG. 4 is a cross-sectional view of a door seal device taken along the line A—A of FIG. 1 according to a modification of the present invention.
Figure 5:
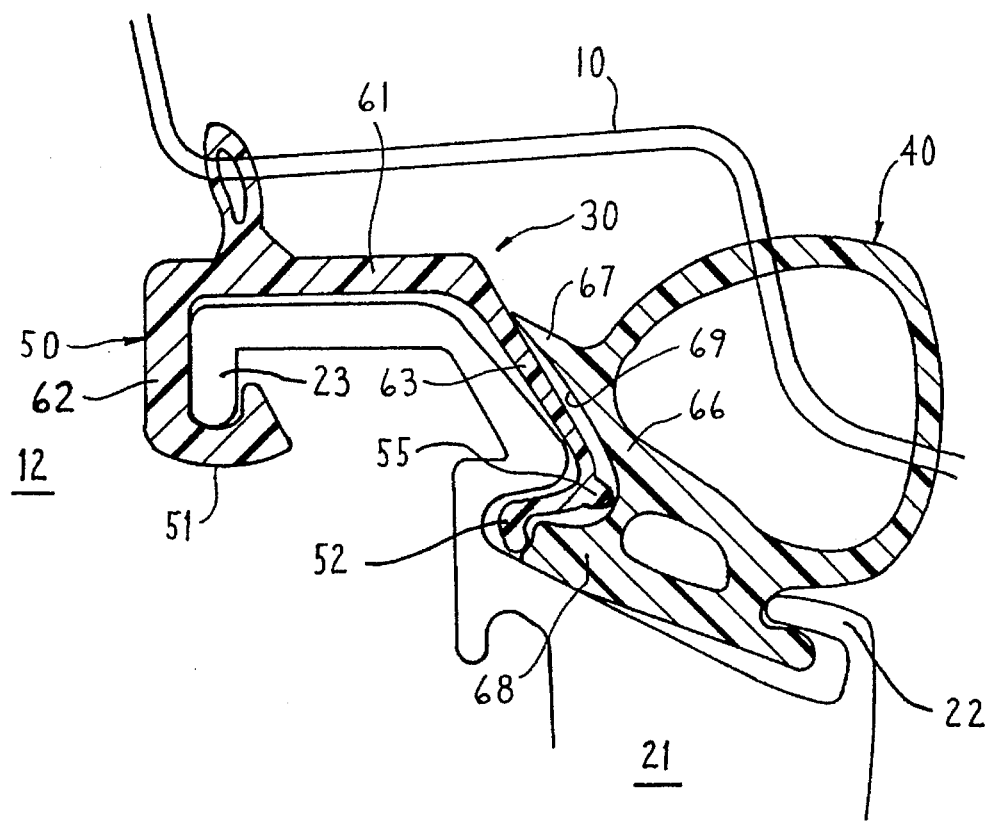
FIG. 5 is a cross-sectional view of a door seal device taken along the line A—A of FIG. 1 according to another modification of the present invention.

The slip-prevention rib 45 projects solely from the main seal 40 in FIG. 4. The slip-prevention rib 55 projects solely from the sub-seal 50 in FIG. 5.

With such an arrangement, there is an advantage that the main seal and the sub-seal are prevented from slipping out of place relative to each other in the longitudinal direction when the door 20 is opened or closed.

What is claimed is:

1. In a door seal device for sealing a space between a vehicle body and a door which is moveable relative to the vehicle body, said seal device comprising a hollow main seal and a sub-seal which elastically contact an opening end edge wall of the body for sealing the space between the body and the door:

the door including a sash composed of a body have a channel-like retainer formed on an upper side thereof adjacent an interior side of the door, and a hook part formed thereon adjacent an exterior side of the door;

the sub-seal being mounted on the sash adjacent the exterior side thereof and including a body which covers an upper surface of the sash adjacent the exterior side thereof, the sub-seal including a first hook portion associated with one side of the body and positioned more closely adjacent the exterior side of the door and engaged with the hook part of the sash, the sub-seal including a second hook portion positioned inwardly relative to the first hook portion and engaged in the channel-like retainer;

said main seal being disposed adjacent the interior side of the door and positioned sidewardly adjacent and arranged along the sub-seal, the main seal having a sidewall part which is positioned in adjacent and opposed relationship to and substantially overlaps a side of said body as well as said second hook portion;

the improvement wherein slip-preventing ribs project outwardly from the main seal and the sub-seal and respectively firmly contact the sub-seal and the main seal at a position where the sidewall part of the main seal overlaps the sub-seal, said position being in the vicinity of said second hook portion.

2. A door seal device according to claim 1, wherein the body of the sub-seal is generally channel-shaped and includes a base wall joined between first and second leg parts which adjacent their free ends are respectively provide with said first and second hook portions, said second leg part and said second hook portion being disposed adjacent and generally overlapped by the sidewall part of said main seal, said sidewall part of said main seal being of a generally concave-shaped configuration defining a concave recess, said second leg part and said second hook portion projecting into said concave recess, and said ribs being located in the vicinity of the bottom of the recess substantially adjacent a corner portion of said sub-seal as defined by the connection of said second hook portion to said second leg part.

3. A door seal device according to claim 2, wherein one said rib projects outwardly from the bottom of the concave recess generally toward the sub-seal, and wherein a further said rib projects outwardly from the corner portion of the sub-seal toward the bottom of the concave recess, said ribs being disposed closely adjacent one another.

4. In a door seal device for sealing a space between a vehicle body and a door which is moveable relative to the vehicle body, said seal device comprising a hollow main seal and a sub-seal which elastically contact an opening end edge wall of the body for sealing the space between the body and the door:

the door including a sash composed of a body have a channel-like retainer formed on an upper side thereof adjacent an interior side of the door, and a hook part formed thereon adjacent an exterior side of the door;

the sub-seal being mounted on the sash adjacent the exterior side thereof and including a generally channel-like body having a base wall and first and second leg parts projecting outwardly from opposite ends of the base wall, the sub-seal including a first hook portion fixed to the first leg part adjacent a free end thereof and projecting inwardly toward the second leg part and engaged with the hook part of the sash, the sub-seal including a second hook portion fixed to the second leg part adjacent a free end thereof and projecting inwardly toward the first leg part and engaged in the channel-like retainer;

said main seal being disposed adjacent the interior side of the door and positioned sidewardly adjacent and arranged along the sub-seal, the main seal having a concave sidewall part which is positioned in adjacent and opposed relationship to and substantially overlaps the second leg part and second hook portion of the sub-seal, the second leg part and the second hook portion being of a generally L-shaped configuration which projects into a concave recess defined by said concave sidewall part;

the improvement wherein a slip-preventing rib is provided on one of said main seal and sub-seal and projects outwardly therefrom for firm contact with the other of said main seal and sub-seal, said rib being positioned generally adjacent the bottom of said concave recess substantially in the vicinity of a corner portion of said sub-seal as defined where said second hook portion joins to the free end of said second leg part.

5. A door seal device according to claim 4, wherein said slip-preventing rib is part of said main seal and projects outwardly from the bottom of said concave recess for firm contact with said sub-seal in the vicinity of said corner portion.

6. A door seal device according to claim 5, wherein a further slip-preventing rib is formed on said sub-seal substantially at and project outwardly from said corner portion for firmly contacting said concave sidewall part in the vicinity of the bottom of said recess.

7. A door seal device according to claims 4, wherein said rib is formed on said sub-seal substantially at said corner portion and projects outwardly therefrom toward said concave sidewall part and firmly engages said concave sidewall part substantially at the bottom of said concave recess.

* * * * *